United States Patent [19]

Misaka et al.

[11] Patent Number: 4,500,652

[45] Date of Patent: Feb. 19, 1985

[54] PROCESS FOR PRODUCING CATION EXCHANGE RESINS WITHOUT SWELLING DURING SULPHONATION PROCESS

[75] Inventors: Yoshiharu Misaka; Takeshi Teraue; Masamiti Hatae, all of Fukuoka, Japan

[73] Assignee: Mitsubishi Chemical Industries, Limited, Tokyo, Japan

[21] Appl. No.: 410,682

[22] Filed: Aug. 23, 1982

[30] Foreign Application Priority Data

Aug. 21, 1981 [JP] Japan ............................... 56-131356

[51] Int. Cl.³ ............................ L08F 8/36; B01J 1/08
[52] U.S. Cl. ..................................... 521/33; 525/329.8
[58] Field of Search ............ 521/33; 525/329.8, 333.5

[56] References Cited

U.S. PATENT DOCUMENTS

| | | | |
|---|---|---|---|
| 2,678,307 | 5/1954 | Ferris et al. | 525/329.8 |
| 3,238,153 | 12/1982 | Hoage et al. | 521/33 |
| 4,192,921 | 3/1980 | Dales | 521/33 |
| 4,246,386 | 1/1981 | Howell et al. | 521/33 |

FOREIGN PATENT DOCUMENTS 47-22474 10/1972 Japan ............................... 525/329.8

*Primary Examiner*—Joseph L. Schofer
*Assistant Examiner*—Peter F. Kulkosky
*Attorney, Agent, or Firm*—Sughrue, Mion, Zinn, Macpeak and Seas

[57] ABSTRACT

A process for producing a cation exchange resin which comprises suspension polymerizing a monomeric mixture comprising (1) styrene, (2) 0.8 to 55 mole %, per mole of styrene, of divinylbenzene and (3) 2 to 20 mole %, per mole of styrene, of acrylic or methacrylic acid and/or its lower alkyl ester, and sulfonating the resulting copolymer particles.

6 Claims, No Drawings

PROCESS FOR PRODUCING CATION EXCHANGE RESINS WITHOUT SWELLING DURING SULPHONATION PROCESS

FIELD OF THE INVENTION

This invention relates to a process for producing a cation exchange resin.

BACKGROUND OF THE INVENTION

Usually, a method comprising sulfonating particles of a copolymer of styrene and divinylbenzene is known for the production of a cation exchange resin. Since a cation exchange resin having a high ion exchange capacity per unit weight is preferred, it is necessary to perform sulfonation uniformly throughout the entire copolymer particles from surface to inside. The styrene-divinylbenzene copolymer, however, has the defect that the inside of the particles does not easily undergo sulfonation.

In order to increase the ion exchange capacity of the styrene-divinylbenzene copolymer, a method which comprises sulfonating the copolymer particles while they are swollen with a swelling agent such as nitrobenzene, and a method which involves the use of a copolymer composed of styrene, divinylbenzene and acrylonitrile as the copolymer particles to be sulfonated have been proposed.

The former method can certainly give a resin having a high ion exchange capacity. Since, however, the swelling agent is used, the number of treating steps increases. Furthermore, the waste acid after sulfonation also contains the swelling agent and cannot be reused. Hence, this method is not economically advantageous.

The latter method is preferred in that no swelling agent is used. According to this method, the ion exchange capacity of the copolymer particles after sulfonation increases, but the copolymer particles undergo breakage and a large amount of cracked particles get mixed in the final product.

SUMMARY OF THE INVENTION

Various investigations have been made to obtain copolymer particles which can be sulfonated well even to their inside without using a swelling agent while avoiding breakage of the particles during sulfonation, it has been found that this purpose can be achieved by using particles of a copolymer derived from a combination of styrene and divinylbenzene with a certain specified monomer.

Accordingly, an object of the present invention is to provide a process for producing a cation exchange resin which comprises suspension polymerizing a monomeric mixture comprising (1) styrene, (2) 0.8 to 55 mole%, per mole of styrene, of divinylbenzene and (3) 2 to 20 mole%, per mole of styrene, of acrylic or methacrylic acid and/or its lower alkyl ester, and sulfonating the resulting copolymer particles.

DETAILED DESCRIPTION OF THE INVENTION

In the present invention, a copolymer obtained by copolymerizing (1) styrene, (2) divinylbenzene and (3) acrylic or methacrylic acid and/or its lower alkyl ester can be used as a matrix of the cation exchange resin to be produced by the process of this invention.

Specific examples of the monomer (3) include methacrylic acid, methyl methacrylate, ethyl methacrylate, butyl methacrylate, acrylic acid, methyl acrylate, and ethyl acrylate. The amount of the monomer (3) is 2 to 20 mole%, preferably 4 to 10 mole%, per mole of styrene. If the amount thereof is too small, the resulting copolymer particles cannot be well sulfonated, and if it is too large, the amount of styrene decreases and an exchange group is not introduced.

The amount of divinylbenzene is determined according to the desired degree of cross-linking of the copolymer, and is 0.8 to 55 mole%, preferably 1.5 to 45 mole%, per mole of styrene.

It is novel in the production of cation exchange resin to use a copolymer containing acrylic acid, methacrylic acid or lower alkyl ester thereof as copolymer particles. It has been known in the production of anion exchange resin to use a copolymer containing methyl methacrylate, trimethl propane trimethacrylate, acrylonitrile, isodecyl methacrylate, etc., as copolymer particles as described in, for example, U.S. Pat. No. 4,207,398.

However, cation exchange resin and anion exchange resin are different in the production methods, treating conditions and the like and also have different properties. For example, in the production of anion exchange resin, acrylonitrile is used as similar to methyl methacrylate as disclosed in U.S. Pat. No. 4,207,398, On the other hand, in the production of cation exchange resin, the use of acrylonitrile is not preferred as is apparent from the data described hereinafter. This difference is due to the technical contents between anion exchange resin and cation exchange resin.

According to the present invention, the monomers are suspension polymerized. Usually, water is used as a dispersing medium, and the amount thereof is 1 to 10 times the weight of the monomers.

Polyvinyl alcohol, carboxymethyl cellulose, etc., are used as a dispersing agent. The amount of the dispersing agent is usually 0.1 to 5.0% by weight based on the weight of the monomers.

Conventional polymerization initiators such as benzoyl peroxide and axo-type catalysts can usually be used in the suspension polymerization. The amount of the polymerization initiator is 0.01 to 15% by weight based on the weight of the monomers.

The polymerization is carred out usually at a temperature of 50° to 90° C. for about 3 to 30 hours.

One embodiment of the polymerization operation comprises charging a polymerization reactor with predetermined amounts of water and the dispersing agent; adding with stirring the monomers having the polymerization initiator dissolved therein to form an oil-in-water type suspended state; and polymerizing the monomers at a predetermined temperature while blowing $N_2$ gas.

The copolymer particles obtained by the suspension polymerization are usually crack-free beads having a particle diameter of about 0.1 to 1.0 mm. The copolymer particles are then sulfonated to form a cation exchange resin.

The sulfonation is usually performed by stirring the copolymer particles in 95 to 100% sulfuric acid. The amount of sulfuric acid used is 3 to 30 times the weight of the copolymer. The sulfonation is carried out usually at a temperature of 50° to 150° C., preferably 90° to 110° C., for about 3 to 30 hours.

The sulfonated copolymer particles are filtered and washed in conventional manner, and after, as required, being converted from its H-form to Na-form, recovered.

According to the present invention, the sulfonation of the copolymer can be well carried out even to the inside of the particles without swelling the copolymer particles with a swelling agent such as nitrobenzene, and a cation exchange resin having a high ion exchange capacity can be obtained. Furthermore, since the copolymer particles are not broken in the sulfonating step, the process of the present invention is very desirable for industrial practice.

The present invention is described in more detail by reference to the following examples and comparison examples, which, however, are not to be construed as limiting the present invention.

EXAMPLES 1 TO 5 AND COMPARISON EXAMPLES 1 TO 2

A 3 liter flask equipped with a stirrer, a thermostat and a nitrogen gas inlet was charged with 2,000 g of water and 3.0 g of polyvinyl alcohol, and a solution consisting of 550 g of styrene, 80 g of divinylbenzene, a compound shown in Table 1 and 0.5 g of benzoyl peroxide was added to the flask. While blowing nitrogen gas into the flask, the monomers were polymerized at 80° C. for 8 hours with stirring.

The copolymer particles were recovered from the reaction mixture after polymerization. 100 g of the copolymer particles were suspended in 650 g of 100% sulfuric acid and sulfonated at 100° C. for 5 hours.

The ion exchange capacity and also the ratio of broken particles during sulfonation of the resulting cation exchange resins were measured, and the results obtained are shown in Table 1 below.

TABLE 1

| Example No. | Compound | Amount[1] Added (mole %) | Ion[2] Exchange Capacity (meq/g) | Ratio of[3] Broken Particles (%) |
|---|---|---|---|---|
| 1 | Ethyl acrylate | 6 | 4.5 | 5 |
| 2 | Ethyl acrylate | 15 | 4.5 | 5 |
| 3 | Methyl methacrylate | 6 | 4.5 | 5 |
| 4 | Ethyl methacrylate | 5 | 4.5 | 5 |
| 5[4] | Methacrylic acid | 7 | 4.5 | 10 |
| Comparison Example 1 | None | — | 2.0 | 80 |
| Comparison Example 2 | Acrylonitrile | 6 | 4.5 | 80 |

Notes
[1] mole % per mole of styrene
[2] Ion exchange capacity per gram of the resin
[3] The ratio of particles having cracks present in 100 resin particles
[4] Example 5 was carried out by changing the amount of benzoyl peroxide to 1.0 g.

While the invention has been described in detail and with reference to specific embodiments thereof, it will be apparent to one skilled in the art that various changes and modifications can be made therein without departing from the spirit and scope thereof.

What is claimed is:

1. A process for producing particles of a cation exchange resin which comprises suspension polymerizing a monomeric mixture consisting essentially of (1) styrene, (2) 0.8 to 55 mole % of divinylbenzene per mole of styrene and (3) 2 to 20 mole % of at least one compound selected from the group of acrylic acid, methacrylic acid and lower alkyl ester thereof, per mole of styrene and sulfonating the resulting copolymer particles substantially in the absence of a swelling agent consisting of organic solvent, wherein said particles have a particle size within the range of from about 0.1 to 1.0 mm and wherein the number of cation exchange resin particles having cracks present per 100 resin particles is 10 or less.

2. A process as claimed in claim 1, wherein the copolymer particles have a particle diameter of 0.1 to 1.0 mm.

3. A process as claimed in claim 1, wherein the sulfonation is carried out using 95 to 100% sulfuric acid.

4. A process as claimed in claim 1, wherein the sulfonation temperature is 50° to 150° C.

5. A process as claimed in claim 1, wherein the monomeric mixture consists essentially of (1) styrene, (2) 1.5–45 mole % of divinylbenzene per mole of styrene and 4 to 10 mole % of at least one compound selected from the group of acrylic acid, methacrylic acid and lower alkyl esters thereof per mole of styrene.

6. A process as claimed in claim 1 wherein the sulfonation temperature is 90° to 110° C. and the sulfonation is conducted with sulfuric acid for a period of from 3 to 30 hours, being used in an amount of 3 to 30 times the weight of the resulting copolymer particles.

* * * * *